(12) United States Patent
Alfier et al.

(10) Patent No.: US 11,109,539 B2
(45) Date of Patent: Sep. 7, 2021

(54) LIGHTING SYSTEM AND CORRESPONDING METHOD

(71) Applicant: OSRAM GmbH, Munich (DE)

(72) Inventors: Alberto Alfier, Vedelago (IT); Luca Mascolo, Treviso (IT)

(73) Assignee: OSRAM GMBH, Munich (DE)

( * ) Notice: Subject to any disclaimer, the term of this patent is extended or adjusted under 35 U.S.C. 154(b) by 301 days.

(21) Appl. No.: 15/766,021

(22) PCT Filed: Sep. 30, 2016

(86) PCT No.: PCT/IB2016/055865
§ 371 (c)(1),
(2) Date: Apr. 5, 2018

(87) PCT Pub. No.: WO2017/060800
PCT Pub. Date: Apr. 13, 2017

(65) Prior Publication Data
US 2018/0288944 A1    Oct. 11, 2018

(30) Foreign Application Priority Data
Oct. 6, 2015 (IT) .................. 102015000058469

(51) Int. Cl.
*A01G 7/04* (2006.01)
*A01G 9/20* (2006.01)
*F21V 23/00* (2015.01)
*F21V 7/00* (2006.01)
*F21V 23/04* (2006.01)
(Continued)

(52) U.S. Cl.
CPC ............ *A01G 7/045* (2013.01); *A01G 9/20* (2013.01); *F21V 7/00* (2013.01); *F21V 23/003* (2013.01); *F21V 23/0464* (2013.01); *F21Y 2103/10* (2016.08); *F21Y 2115/10* (2016.08); *Y02P 60/14* (2015.11)

(58) Field of Classification Search
CPC ........ A01G 9/20; A01G 7/045; F21V 23/0464
USPC ........................................................ 362/805
See application file for complete search history.

(56) References Cited

U.S. PATENT DOCUMENTS

2003/0009933 A1    1/2003  Yoneda et al.
2004/0149998 A1    8/2004  Henson et al.
(Continued)

FOREIGN PATENT DOCUMENTS

CN    1400863 A    3/2003
CN    1742217 A    3/2006
(Continued)

OTHER PUBLICATIONS

International Search Report based on application No. PCT/IB2016/055865 (11 pages) dated Nov. 30, 2016 (for reference purpose only).
(Continued)

*Primary Examiner* — Karabi Guharay
(74) *Attorney, Agent, or Firm* — Viering, Jentschura & Partner mbB

(57) ABSTRACT

A system for lighting a space for growing vegetables, e.g. a greenhouse, wherein the system includes a first set of lighting sources for lighting the vegetables in a first, vertical direction, a second set of lighting sources for lighting the vegetables in at least one second direction, different from the vertical direction, e.g. in a horizontal and/or oblique direction.

20 Claims, 2 Drawing Sheets

(51) Int. Cl.
*F21Y 103/10* (2016.01)
*F21Y 115/10* (2016.01)

(56) References Cited

U.S. PATENT DOCUMENTS

| | | |
|---|---|---|
| 2010/0076620 A1 | 3/2010 | Loebl et al. |
| 2011/0209404 A1* | 9/2011 | Scott ........................ A01G 7/00 47/58.1 LS |
| 2012/0075848 A1* | 3/2012 | Yamada ................. A01G 7/045 362/231 |
| 2013/0258684 A1* | 10/2013 | Yang ........................ A01G 9/26 362/386 |
| 2014/0325908 A1* | 11/2014 | Faris ...................... A01G 31/06 47/62 A |

FOREIGN PATENT DOCUMENTS

| | | |
|---|---|---|
| CN | 101547597 A | 9/2009 |
| EP | 2090824 A2 | 8/2009 |
| EP | 2433489 A2 | 3/2012 |
| EP | 2710883 A1 | 3/2014 |
| GB | 2434521 A | 8/2007 |
| WO | 0041557 A1 | 7/2000 |
| WO | 2014182600 A1 | 11/2014 |

OTHER PUBLICATIONS

Chinese Office Action issued for corresponding CN application No. 201680058381.6, dated Nov. 11, 2019, 8 pages (for informational purpose only).
European Office Action issued for the corresponding EP application No. 16 788 221.6, dated Jul. 28, 2020, 6 pages (for informational purposes only).

* cited by examiner

LIGHTING SYSTEM AND CORRESPONDING METHOD

RELATED APPLICATIONS

The present application is a national stage entry according to 35 U.S.C. § 371 of PCT application No.: PCT/IB2016/055865 filed on Sep. 30, 2016, which claims priority from Italian application No.: 102015000058469 filed on Oct. 6, 2015, and is incorporated herein by reference in its entirety.

TECHNICAL FIELD

Various embodiments relate to lighting devices.

One or more embodiments may refer to lighting systems adapted to be employed, e.g., for greenhouse lighting.

BACKGROUND

Lighting installations employing solid-state radiation sources (Solid-State Lighting, SSL), e.g. with LED lighting sources, have so far experienced in the agricultural sector (e.g. in the horticultural or floricultural sector) a slower penetration than in other lighting technology fields, e.g. in the automotive sector.

This may be attributed, at least partly, to the fact that traditional lighting systems, e.g. employing High Pressure Sodium (HPS) lamps, are still competitive in terms of efficiency and reduced initial cost of installation.

This may be the case, for example, of lighting systems employing a distributed matrix of ceiling HPS fixtures, e.g. with lamps having a power of 0.3 kW-1 kW which are mounted e.g. at 3.5 m height with 3 m pitch.

These systems, however, suffer from intrinsic drawbacks.

As a matter of fact, they are adapted to provide a uniform vertical lighting during the initial growing stages of the plant, but when plants have grown and developed a rather thick foliage, the plants located halfway between two lamps may receive less light than those arranged exactly below a lamp.

This drawback may have particularly disadvantageous effects with plants having a relevant vertical growth and thick foliage, which may receive insufficient lighting in the mature stage, ultimately jeopardizing the productivity of a few vegetable plants such as tomatoes and the like.

SUMMARY

One or more embodiments aim at overcoming such drawbacks.

According to one or more embodiments, said object may be achieved thanks to a lighting system having the features set forth in the claims that follow.

One or more embodiments may also concern a corresponding operating method.

The claims are an integral part of the technical teaching provided herein with reference to one or more embodiments.

One or more embodiments may provide a mixing of a vertical illumination with another, e.g. horizontal, illumination. This may be achieved, for example, by arranging lighting sources both above and sidewise of plants, so as to provide plants with light both in the vertical and in the horizontal direction.

In one or more embodiments, the use of solid-state, e.g. LED, sources as light radiation sources makes it possible to take advantage of certain features of said sources, such as the possibility of achieving a uniform illuminance distribution with a homogeneity which may hardly be obtained with traditional, e.g. HPS, sources, which provide a rather concentrated lighting.

One or more embodiments may lead to the achievement of a volumetric distribution of illumination, which may be adjusted to suit the different stages of plant growth and life.

For example, in one or more embodiments, e.g. in a greenhouse, during the initial growing stage it is possible to implement a uniform illumination from above, adapted to efficiently reach every plant, the possibility being given of subsequently preventing the growing foliage from overshadowing the lower parts of the plants.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

In the following description, numerous specific details are given to provide a thorough understanding of embodiments.

The embodiments may be practiced without one or several of the specific details, or with other methods, components, materials, etc. In other instances, well-known structures, materials, or operations are not shown or described in detail to avoid obscuring various aspects of the embodiments. Reference throughout this specification to "one embodiment" or "an embodiment" means that a particular feature, structure, or characteristic described in connection with the embodiment is included in at least one embodiment. Thus, the possible appearances of the phrases "in one embodiment" or "in an embodiment" in various places throughout this specification are not necessarily all referring to the same embodiment. Furthermore, particular features, structures, or characteristics may be combined in any suitable manner in one or more embodiments.

The headings provided herein are for convenience only, and therefore do not interpret the extent of protection or the scope of the embodiments.

Figure 1:
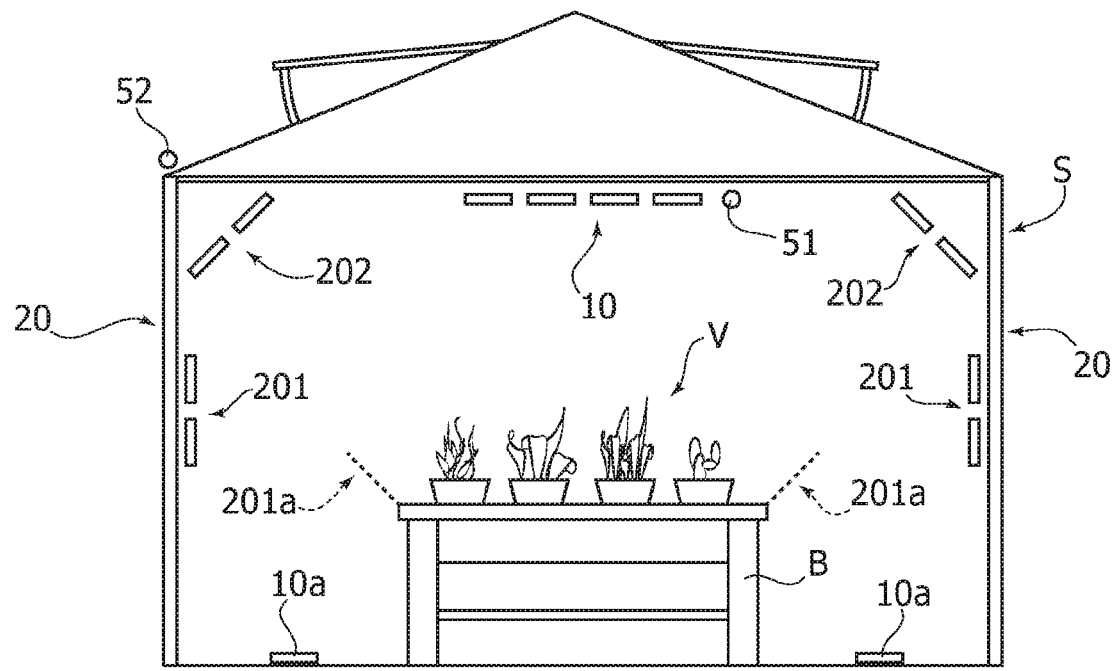
FIG. 1 schematically shows possible applications of one or more embodiments.

FIG. 1 schematically shows a space S adapted to be used for growing vegetables V.

Space S may be e.g. the internal space of a greenhouse for horticultural or floricultural applications.

By way of example, the figure shows the possible presence of vegetables V, such as plants located within space S (which may be either an indoor or an outdoor space), e.g. arranged on a bench B.

Such spaces for vegetable growing are known in a wide range of possible implementations, which makes it unnecessary to provide a detailed description thereof.

In one or more embodiments, space S may be equipped with a lighting system for illuminating plants V (in the following denoted as "vegetables") in order to promote their growth even despite unfavourable environmental conditions (harsh outer climate, insufficient sunlight, etc.).

In one or more embodiments, such lighting system or equipment may comprise a plurality of lighting sources adapted to be organized into two sets, such as:
- a first set of lighting sources 10 (optionally adapted to include further lighting sources 10*a*),
- a second set of lighting sources 20 (in turn adapted to include two sub-sets of lighting sources respectively denoted as 201 and 202).

In one or more embodiments, lighting sources 10, 20 may be implemented (with possible variations according to the set they belong to, as will be detailed in the following) with an arrangement as exemplified in FIGS. 3 to 5 and denoted on the whole as 100.

In one or more embodiments, said lighting source arrangement 100 may include a housing 102 which is closed at both ends by two walls 102*a*.

In one or more embodiments, e.g. the arrangement may be channel-shaped and may comprise e.g. a profiled body of a lightweight metal or plastic material, optionally provided with heat dissipation fins on the outside.

In one or more embodiments, e.g. in either or both end walls 102*a*, there may be provided one or more openings (which may be lined with glands 104) for the passage of electric wires (power cables and optionally control cables), as well as ears or flanges 106 or similar fixing formations which enable mounting arrangement 100 in space S.

In one or more embodiments, the internal volume of the housing thus obtained may host one or more solid-state light radiation sources 108, e.g. either single or plural LED sources, e.g. being adapted to be mounted on respective support boards of the Printed Circuit Board (PCB) type, and/or having drivers 110 and/or respective optics 112, e.g. reflectors, associated thereto.

Moreover, the possibility is given to implement, according to the application needs, light radiation emission patterns which may be wide or narrow, symmetric or asymmetric.

Referring again to FIG. 1, it will be remarked that the lighting sources of the first set 10 may be located primarily above "vegetables" V, so as to illuminate them from above in a first direction, which is a vertical direction.

In one or more embodiments, such vertical lighting may be implemented not only from above but also from below, e.g. by having the first set of lighting sources comprise, in addition to sources 10 mounted above (i.e. on the ceiling of space S), sources 10*a* arranged on the bottom of such a space, e.g. on the floor. Therefore, it is possible to obtain a vertical lighting from below on vegetables V arranged in a hanging condition (e.g. creepers or plants in hanging pots).

Moreover, FIG. 1 highlights that, in one or more embodiments, the lighting sources of the second set 20 may be located primarily sidewise of vegetables V (see sources 201), so that they are illuminated in at least one second illumination direction, e.g. the horizontal direction, which is different from the vertical direction.

Moreover, FIG. 1 highlights that the lighting sources of the second set 20 may also be located in an oblique position (see sources 202) so as to illuminate vegetables in a (third) oblique lighting direction, intermediate between the vertical and the horizontal direction.

It will be appreciated that, both for lighting sources 10, 10*a* of the first set and for lighting sources 20 (201, 202) of the second set, the mounting arrangement within space S may be made compatible with the structure of space S.

For example, both sources 10 and sources 20 may be supported by elements such as generally thin beams or pillars, which therefore do not hamper the propagation of sun radiation from outside space S towards vegetables V.

As previously stated, in one or more embodiments, the lighting sources of second set 20 may be mounted in an overall lateral position (as exemplified at 201), e.g. on sides opposed to vegetables V (so that they can light vegetables in at least one second direction, other than the vertical direction of first set 10). In one or more embodiments, said second lighting direction is substantially horizontal (as exemplified for sources 201 of FIG. 1).

In one or more embodiments, the second set of lighting sources 20 may comprise a (sub-)set of sources 202, adapted to illuminate vegetables V in an oblique direction, i.e. along a direction which is at least approximately intermediate between the vertical direction of sources 10 and the horizontal direction of the sources of sub-set 201.

Generally speaking, a solution as exemplified in FIG. 1 is adapted to implement the lighting of vegetables V:
- in a first vertical direction (from above and optionally from below),
- in a second sidewise horizontal direction, and
- in a third oblique direction, intermediate between the vertical and the horizontal direction.

This facilitates the achievement of constant illuminance conditions of vegetables V, while preventing e.g. the growth and development of the foliage from overshadowing the lower portions of vegetables V: the possible vertical light masking effect due to the foliage growth may indeed be compensated for by the lighting action performed in a horizontal direction (by the sources of sub-set 201) and optionally in an oblique direction (by the sources of sub-set 202).

For example, during the initial growing stages, vegetables V may be illuminated solely or nearly exclusively from above, e.g. by sources 10, the lighting sources 20 being activated only in a subsequent growing stage of the plants.

In one or more embodiments, the lighting sources of first set 10 and of second set 20 may be controlled by selectively varying either the intensity or the spectrum of the radiation emitted by such sources.

Figure 2:
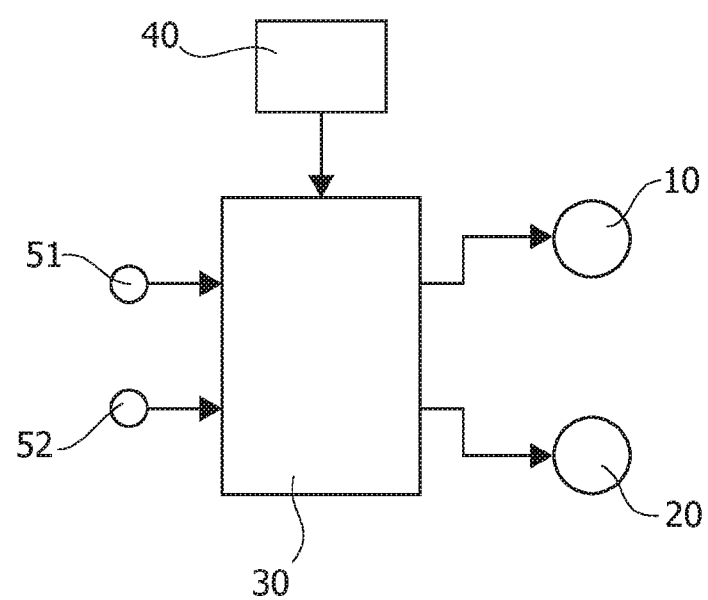
FIG. 2 is a schematic block diagram of the control of a lighting system according to one or more embodiments.

This possible operation mode is schematically exemplified in FIG. 2, wherein both sets of lighting sources 10 (in the following we will implicitly assume that this set may also comprise the sources 10*a* acting from below) and of lighting sources 20 (sub-sets 201 and 202) are controlled via a control system 30 (e.g. a microcontroller or a computer) adapted to act e.g. as a function of commands imparted via a programming interface 40 and/or as a function of signals produced by sensors 51 and/or 52.

In one or more embodiments, these sensors may detect e.g. the intensity and/or the spectrum of sun light. For example, they may distinguish day from night and/or the various periods of the day.

In one or more embodiments, sensors may be provided both inside space S (see e.g. sensor 51) and externally of space S (see e.g. sensor 52), so that it is possible to take into account the effects of the structure of space S (e.g. of the greenhouse walls, which may be masked/shadowed) on the sun radiation.

For example, in one or more embodiment, sources 10, 20 may be driven so as to reproduce the evolution of the intensity and/or the direction of the external sun radiation (e.g. during the various parts of the day: dawn, noon, twilight etc.), so as to reproduce the illuminance distribution pattern and the intensity of sun light during the day.

For example, in one or more embodiment, at dawn and at twilight the sidewise lighting (sources 201 and optionally 202) may be more intense than vertical lighting (sources 10), while at noon vertical lighting (sources 10, for example) is more intense than sidewise lighting (sources 201 and optionally 202).

In one or more embodiments, the structure of sources 10, 20 (which may be implemented e.g. as exemplified in FIGS. 3 and 5) enables the installation of the lighting system and the optional modification of the features thereof according to the application needs. It is therefore possible to take into account factors such as the type of vegetables (and therefore the size they are bound to reach during their growth) and/or the growth conditions, by optionally modifying the system features (number of sources, illuminance, power) e.g. by enhancing them as vegetables V grow, while avoiding the use of an oversized system during the initial stages of growth.

In one or more embodiments, the control action achievable via controller 30, 40 may enable "tuning" the spectrum of light radiation emitted by sources 10, so as to reproduce the variation of sun light during the day.

For example, in one or more embodiments it is possible to resort to lighting sources which are controllable in their Correlated Color Temperature (CCT). This may be achieved by using a "warmer" radiation (CCT of about 2700 K) at dawn and by gradually turning it into a "colder" temperature (e.g. CCT of about 5600 K) at around noon, then reverting to a warmer light at twilight.

In one or more embodiments a stage of darkness may be provided, wherein sources 10, 20 are practically off, so as to more closely reproduce the natural lighting cycles which vegetables V may be exposed to.

In one or more embodiment, said cyclical control actions may be implemented not on a daily basis, according to a standard day duration, but by modulating the succession of dawn, noon and twilight in periods other than the daily cycle.

In one or more embodiments, a balancing action of the light radiation intensity emitted by first set 10 and second set 20 may be implemented, in such a way as to take into account that the direction of sun radiation varies with the latitude (so that sun at noon does not necessarily shine vertically above vegetables V, but may illuminate them at a different angle according to the distance from the poles or from the equator).

In one or more embodiments, the spectrum of the radiation emitted by sources 10 and 20 may be varied by using e.g. red and blue light radiation sources (e.g. LEDs), optionally combined with additional white light sources, which may be used e.g. in order to improve the visibility conditions in space S when operators are present and perform various interventions on vegetables V.

In one or more embodiments, the various lighting sources 10, 20 may be powered with higher or lower intensity as a function of the various growing stages of the plants, by optionally resorting to two or more different types of sources, e.g. 600 nm and 730 nm LEDs, to enhance the illumination of photochromes.

In one or more embodiments (e.g. via sensors 51 and 52), the intensity of the light radiation emitted by sources 10 and sources 20 may be regulated in order to compensate for the absorption of sun light by the (generally transparent but not necessarily neutral) structure of space S.

In one or more embodiments, the spectrum (and the intensity) of sun light radiation may be sensed both inside (sensor 51) and outside (sensor 52) space S, and steps may be taken accordingly via system 30 by acting on the intensity and/or the spectrum of the radiation emitted by lighting sources 10 and 20. In one or more simplified embodiments, such sensing action of the solar radiation may be performed only inside space 20 (sensor 51 in FIG. 1).

In one or more embodiments, lighting sources 10, 20 may comprise, in addition to lighting sources emitting in the visible spectrum, also light radiation sources emitting outside the visible spectrum, for example in the (e.g. near) infrared.

In one or more embodiments, the implementation of different lighting directions (e.g. vertical and horizontal) may not necessarily require the arrangement of the first and of the second sets 10 and 20 in spatially separated locations, as exemplified in FIG. 1.

In one or more embodiments, as a matter of fact, optical elements (e.g. reflective mirrors) may be provided in order to deflect the vertical light radiation in the horizontal direction, so that such optical elements (e.g. mirrors 201a, as schematically shown in dashed lines in FIG. 1) may practically act as lighting sources of the second set 20. In this way the specific arrangement of light radiation sources e.g. at lateral walls of space S may become unnecessary.

Similarly, a solution may be envisaged wherein light radiation sources are arranged sidewise of vegetables V, but project light radiation towards optical elements (e.g. mirrors) adapted to deflect such light radiation so as to obtain a light radiation coming vertically from above onto vegetables V.

In one or more embodiments, such optical elements may comprise, e.g. in addition or alternatively to mirrors such as mirrors 201a, optical fibre bundles adapted to capture the light radiation emitted by light radiation sources arranged e.g. in the upper portion of space S, and to emit it sidewise (e.g. in a horizontal direction) towards vegetables V, therefore acting once again as lighting sources of the second set. Optical fibre bundles of this kind are known, for example, in the building sector for illuminating dark rooms.

In one or more embodiments, the use of such optical elements, whatever they may be, may help achieving an oblique lighting action (exemplified herein by the sources denoted as 202 in FIG. 1) by employing e.g. mirror reflectors or optical fibre bundles adapted to capture the light radiation emitted by sources located in the upper portion or sidewise of space S, and to lead it where it is required, in such a way as to obtain an illuminating action in the vertical, horizontal or oblique direction, according to the application needs.

In one or more embodiments, light radiation sources may be employed which, e.g. thanks to a coupling with optical assemblies, are adapted to have particularly wide radiation patterns. These sources may be of the kind used in street lighting applications, e.g. to illuminate pedestrian areas, the possibility being given of achieving a uniform illuminance on the ground, with angles of aperture up to 70° with respect to the mounting position, e.g. on a pole or a street lamp. At the same time, a single light radiation source may be adapted to emit light both in a vertical direction and in a second direction (e.g. an oblique direction) with respect to vegetables V.

In this case, such light radiation sources having a widened radiation pattern simultaneously act as lighting sources of the first set (lighting in the vertical direction) and as lighting sources of the second set (e.g. in the oblique or horizontal direction).

One or more such embodiments may feature low costs, while however possibly leading to a reduction of sidewise illumination.

Figure 3:
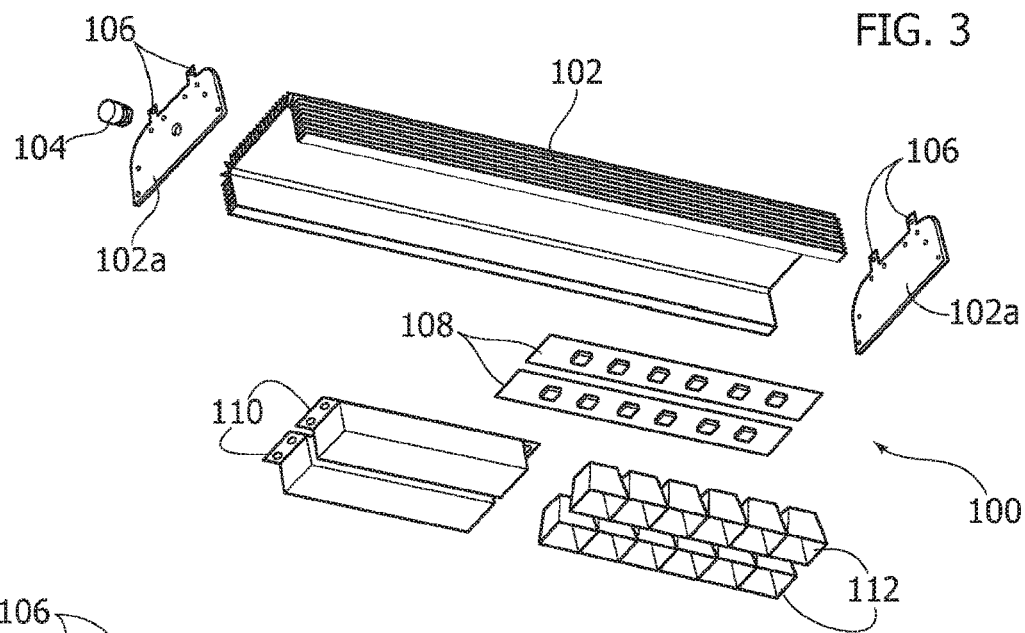
FIG. 3 is an exploded perspective view of a lighting source adapted to be employed in a system according to one or more embodiments.
Figure 4:
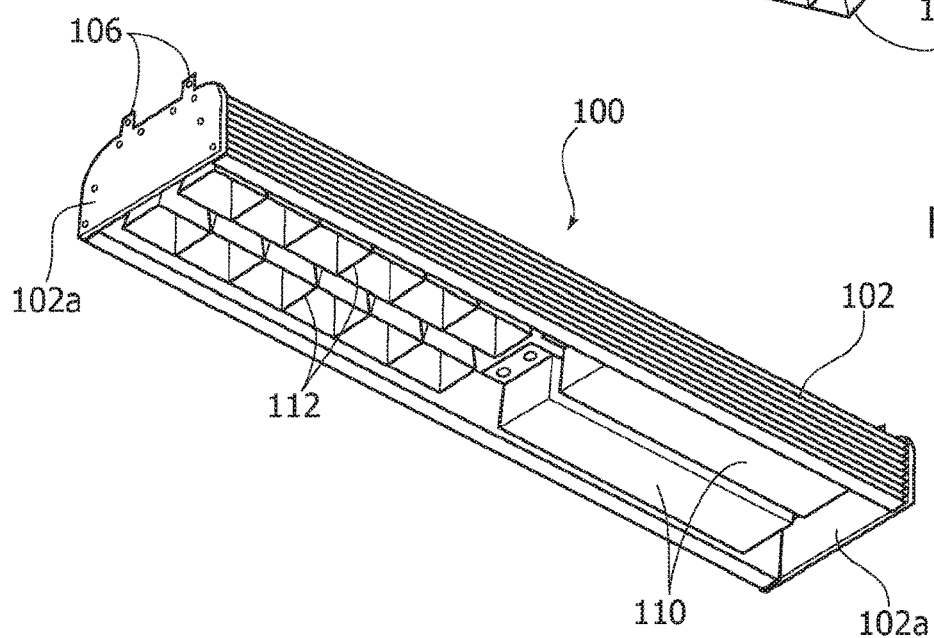
FIGS. 4 and 5 show, from approximately opposed viewpoints, a lighting source adapted to be employed in one or more embodiments, in a perspective view.
Figure 5:
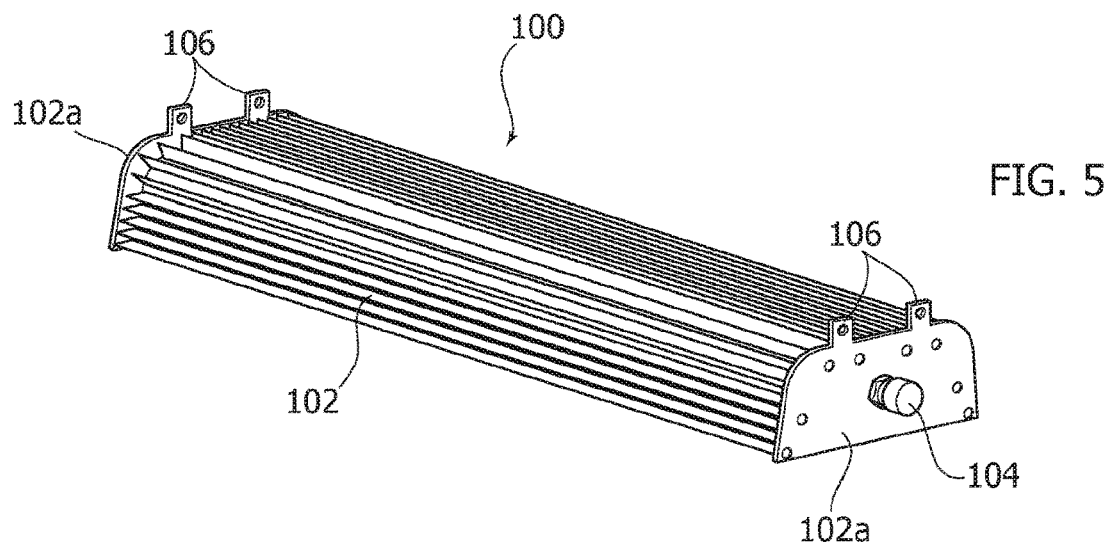

In one or more embodiments lighting sources may be used which, although optionally providing a common arrangement as exemplified in FIGS. 3 and 5, show different characteristics as regards the emission spectrum of sources 108, the light radiation emission pattern (as determined by optics 112), the size, etc. In one or more embodiments, this may lead to rather wide light radiation emission patterns (e.g. for vertical lighting) and narrower light radiation emission patterns (e.g. for sidewise/oblique lighting).

Without prejudice to the basic principles, the implementation details and the embodiments may vary, even appreciably, with respect to what has been described herein by way of non-limiting example only, without departing from the extent of protection.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The extent of protection is defined by the annexed claims.

What is claimed is:

1. A lighting system for lighting a space for growing vegetables, wherein the system includes:
   a first set of lighting sources for lighting the vegetables in a first, vertical direction, the first set of lighting sources disposed within a housing,
   a second set of lighting sources for lighting the vegetables in at least one second direction, different from the vertical direction, the second set of lighting sources disposed within the housing;
   at least a first sensor disposed within the housing and at least a second sensor disposed outside of the housing, wherein the at least first sensor and the at least second sensor are configured to detect the intensity and/or spectrum of sunlight; and
   a control system comprising at least one controller, the control system configured to control the first set and the second set of lighting sources by selectively varying either the intensity or the spectrum of the radiation emitted by the first and second lighting sources so as to reproduce an illuminance distribution pattern and intensity of sunlight based on the detected intensity and/or spectrum of the sunlight and to compensate for absorption of the sunlight by the structure of the housing,
   wherein the lighting sources in the first set and the lighting sources in the second set have different radiation patterns with respect to intensity, spectrum and spatial distribution, and wherein the second set of lighting sources includes lighting sources for lighting the vegetables sidewise in a horizontal direction.

2. The lighting system of claim 1, wherein the second set of lighting sources includes lighting sources for lighting the vegetables in an oblique direction between the vertical direction and the horizontal direction.

3. The lighting system of claim 1, wherein the first set of lighting sources includes lighting sources for lighting the vegetables in a vertical direction from below.

4. The lighting system of claim 1, wherein the lighting sources include optical elements for deflecting light radiation between the vertical direction and said at least one second direction different from the vertical direction.

5. The lighting system of claim 4,
   wherein the optical elements are for deflecting light radiation from the vertical direction towards said at least one second direction different from the vertical direction.

6. The lighting system of claim 1, including light radiation sources having a radiation pattern including both a first lighting component in the vertical direction and at least one second lighting component in a second direction, different from the vertical direction.

7. The lighting system of claim 1, including both lighting sources emitting in the visible spectrum and light radiation sources emitting light radiation outside the visible spectrum.

8. The lighting system of claim 7,
   wherein the light radiation sources emit light radiation in the infrared.

9. The lighting system of claim 1,
   wherein the first set has a wide radiation pattern and the second set has a narrow radiation pattern.

10. The lighting system of claim 1, wherein the housing is a greenhouse.

11. The lighting system of claim 1, wherein the first set and the second set of lighting sources are driven so as to reproduce the evolution of the intensity and/or the direction of the external sun radiation so as to reproduce the illuminance distribution pattern and the intensity of sun light during the day.

12. The lighting system of claim 1, wherein the control system is configured to operate the first set and second set of lighting sources so that, at dawn and at twilight sidewise is more intense than vertical lighting and while at noon vertical lighting is more intense than sidewise lighting.

13. The lighting system of claim 1, wherein the control system is configured to implement a balancing action of the light radiation intensity emitted by the first set and second set of lighting sources, so as to take into account that direction of sun radiation varying with latitude.

14. The lighting system of claim 1, wherein the control system is configured to implement tuning of the spectrum of radiation intensity by the first set and second set of lighting sources, so as to reproduce a variation of sunlight during the day.

15. The lighting system of claim 1, wherein the first set and second set of lighting sources are controllable in their Correlated Color Temperature (CCT), and wherein control system is configured to control the first and second set lighting sources to have a warmer radiation at dawn and gradually changing to have colder temperature at around noon, then changing to have a warmer light at twilight.

16. The lighting system of claim 1, wherein both the spectrum and the intensity of sun light radiation is sensed both inside and outside, and wherein the control system is configured to control the intensity and/or the spectrum of the radiation emitted by first and second set of lighting sources so as to reproduce the illuminance distribution pattern and the intensity of sun light during the day.

17. A method of operating a lighting system, the lighting system comprising a first set of lighting sources within a housing for lighting the vegetables in a first, vertical direction, a second set of lighting sources within the housing for lighting the vegetables in at least one second direction, different from the vertical direction, at least a first sensor within the housing, and at least a second sensor outside of the housing, the method including:

controlling the lighting sources of the first set and in the second set by selectively varying at least one of the intensity and the spectrum of the lighting radiation emitted by said lighting sources;

sensing, using the at least first sensor and the least second sensor, an intensity and a spectrum of sunlight radiation towards said space for growing vegetables;

adjusting at least one of intensity and spectrum of the lighting radiation emitted by the first and second set of lighting sources as a function of said sensing and setting a given ratio of the intensity of the lighting radiation emitted by the lighting sources of the first set to the intensity of the lighting radiation emitted by the lighting sources of the second set so as to achieve of a volumetric distribution of illumination adjusted to suit different stages of growth and life of the vegetables.

18. The method of claim 17, including at least one of:

cyclically making the intensity of the lighting radiation emitted by the lighting sources of the second set stronger than the intensity of the lighting radiation emitted by the lighting sources of the first set and making the intensity of the lighting radiation emitted by the lighting sources of the first set stronger than the intensity of the lighting radiation emitting by the lighting sources of the second set, cyclically making the colour temperature of the lighting radiation emitted by said lighting sources lower and higher, and/or cyclically de-activating said lighting sources.

19. The method of claim 18, wherein said cyclically is on a per-day basis.

20. The method of claim 17, wherein adjusting at least one of intensity and spectrum of the lighting radiation emitted by the first and second set of lighting sources comprises selectively varying either the intensity or the spectrum of the radiation emitted by the first and second lighting sources so as to reproduce an illuminance distribution pattern and intensity of sunlight.

* * * * *